May 24, 1949.　　　　　E. E. WEMP　　　　　2,471,179
HYDROKINETIC TORQUE CONVERTER
Filed Jan. 23, 1943　　　　　　　　　　　7 Sheets-Sheet 1

INVENTOR.
Ernest E. Wemp
BY Barnes, Kisselle, Laughlin & Raisch
Attorneys.

May 24, 1949.  E. E. WEMP  2,471,179
HYDROKINETIC TORQUE CONVERTER
Filed Jan. 23, 1943  7 Sheets-Sheet 6

INVENTOR.
Ernest E. Wemp
BY Barnes, Kisselle, Laughlin & Rausch
Attorneys.

Fig. 12

Patented May 24, 1949

2,471,179

UNITED STATES PATENT OFFICE 2,471,179

HYDROKINETIC TORQUE CONVERTER

Ernest E. Wemp, Detroit, Mich.

Application January 23, 1943, Serial No. 473,337

8 Claims. (Cl. 60—54)

This invention relates to a torque converter and it has to do particularly with a hydro-kinetic torque converter useful in connection with internal combustion engines, for providing variable torque and speed ratios. The torque converter is, of course, useful for the transmission of power where the prime mover is other than an internal combustion engine, but it is probably convenient to visualize the structure disclosed as associated with such an engine in an automotive vehicle.

The invention can be carried out in a hydraulic mechanism which has a torus chamber extending around the axis of rotation of driving and driven shafts and wherein the torus chamber has such an axial extent that there is an axial flow of the liquid therein, and where an impeller, a stator and a turbine, all have blades or vanes functioning in the torus chamber where the flow of the liquid is axial.

A general object of the invention is to provide a torque converter wherein much of its action is automatic for varying the speed and torque ratios between a driving member and a driven member, and wherein there is also embodied a manual control, or at least a control operable at will by an operator, for establishing a substantially neutral condition where substantially no torque is transmitted. To these ends the blades on the impeller are adjustable as to their angularity and, in the form shown, the impeller blades are under the control of the operator so that they can be shifted through an appropriate angle to and from extreme positions, one of which provides a substantially zero pitch and the other of which a maximum pitch, or to intermediate positions. In conjunction with this manual control the impeller blades and associated structure provides for an automatic action wherein the impeller blades take a position, dependent considerably upon the load or the forces to which the impeller blades are subjected in setting up and maintaining a flow of the liquid in the torus chamber. This latter automatic action is governed by a yielding means which resists the tendency of the load on the impeller blades to shift the same angularly. The stator blades may be fixed. The turbine blades in the form shown, while being angularly adjustable to and from high ratio and low ratio positions and intermediate positions, have no control operable directly by an operator, but to the contrary, are under the combined controlling action of centrifugal force and output torque. Thus, the turbine blades are automatically governed as to pitch by the two cooperating functions of speed and load.

In accordance with the invention, the driving member is rotated in one direction only while the driven member, in one form of the invention, is caused to rotate in a direction reverse to that of the driving member; in another form of the invention the driven member is caused to rotate in the same direction as the driving member. However, whichever form of the invention is utilized, the driven member is always given one direction of rotation. It will be appreciated that the rotary bladed impeller, which functions to set up and maintain a flow of liquid in the torus chamber, causes an axial flow of the liquid in the portion of the torus chamber where the blades are positioned and, at the same time, the rotary impeller blades impart to the liquid a tangential component, due to the friction or drag of the fluid in passing along the blade surfaces. The manner of handling this flow of liquid as to its tangential component is one of the factors which may determine the direction of rotation of the driven member. This embodies a selection of the form of blades used in the stator and the turbine. Other objects will be appreciated from a consideration of the following description and from a consideration of the nature of the claims appended thereto. An apparatus for carrying out the invention is shown in the accompanying drawings, and in these drawings:

Figure 1:
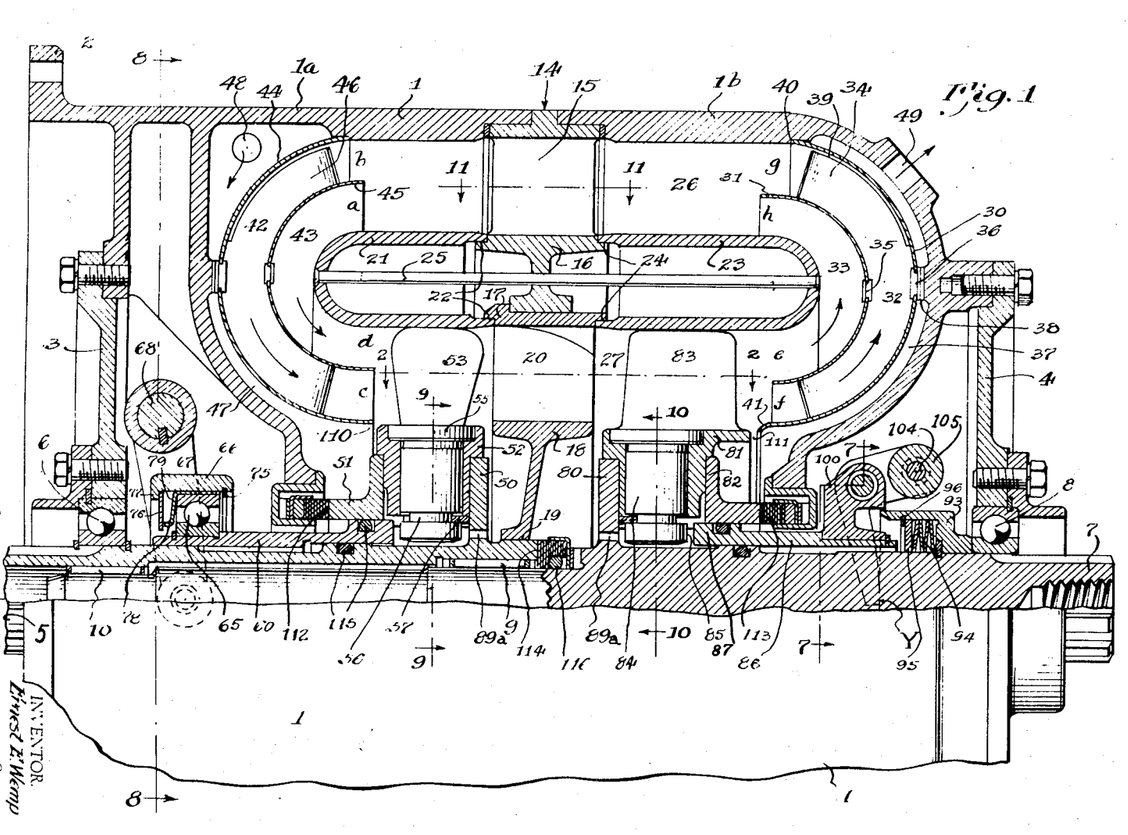
Fig. 1 is a general longitudinal view showing in section a half portion of the torus chamber and associated mechanism.

Considering first the illustration in Fig. 1, it will be seen that the mechanism is disposed in a housing 1 which may be flanged as at 2 for attachment to an engine. The housing may comprise a forward part 1a and a rearward part 1b which are assembled together and which may have removable end plates 3 and 4. A drive shaft 5 is journalled in the housing as by means of a bearing 6, this drive shaft being connectable to the crank shaft of an engine. A driven shaft 7 is journalled in the housing as at 8 and one shaft may be piloted in the other. To this end the drive shaft 5 is in the form of a sleeve, although it is preferably termed a shaft herein because the word sleeve will be used for describing another part, and the driven shaft extends into the drive shaft and the two are associated through bearing means as, for example, roller bearings 9 and 10.

Figures 8, 11:
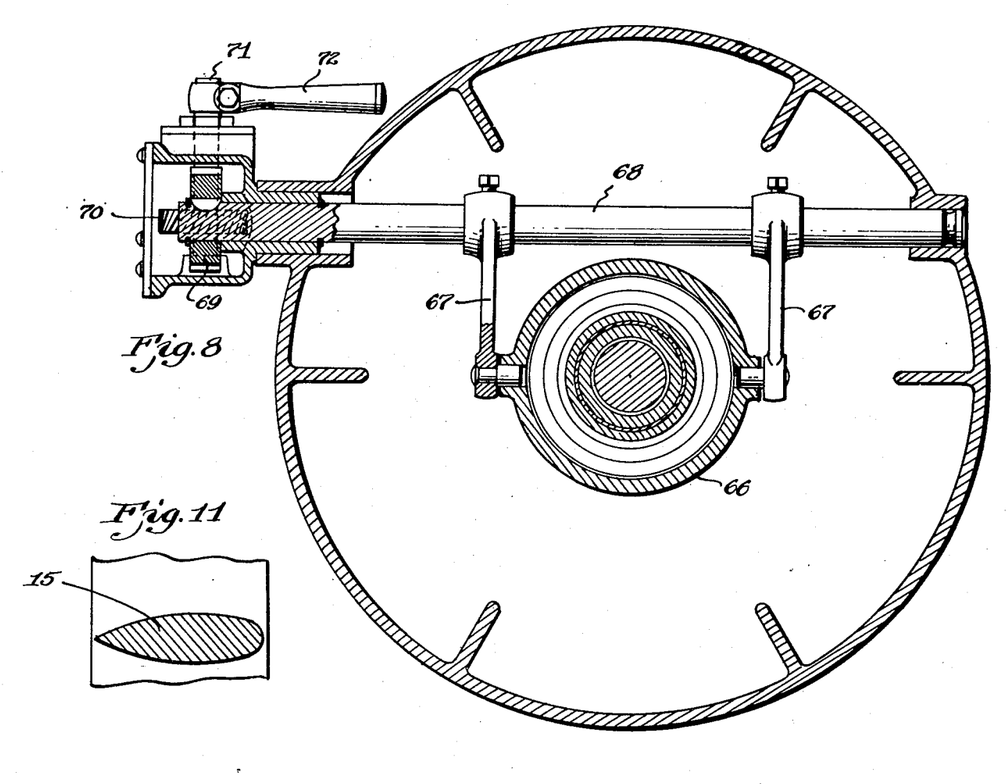
Fig. 8 is a cross sectional view taken substantially on line 8—8 of Fig. 1, illustrating the control means for regulating the pitch of the impeller blades.
Fig. 11 is a cross sectional view taken on line 11—11 of Fig. 1, showing one of the stator supports.

The housing provides the torus chamber and supports the stator. The stator is generally illustrated at 14 constructed to be assembled and carried at the juncture of the two housing parts and it has a number of circumferentially arranged spaced struts 15 which may be of streamline form in cross section, as shown in Fig. 11, and which carry a ring-like part 16. The inner portion of the stator comprises a ring-like part 17 which may be press fitted into the outer portion 16, and a ring-like portion 18 which has an inwardly extending flange with a running clearance at 19 with the drive shaft 5. This inner portion of the stator carries the stator blades 20, the blades being disposed between the ring members 17 and 18 and these ring members constitute wall sections for the torus chamber.

The stator supports the inner wall or core of the torus chamber. One portion of the core 21 may seat on the stator as at 22. The opposite core part 23 may seat on the stator as at 24 and the core parts may be held in position by a suitable number of stay rivets 25.

It will be observed that an axially elongated torus chamber is provided having an outer axial passageway 26 in which the struts 15 are located, and an inner axial passageway 27 in which the blades of the stator are located. The ends of the torus chamber, that is, the opposite portions where the liquid is turned through 180°, are preferably of a nest construction having inner and outer passageways or channels constructed in accordance with the torus chamber disclosed in copending application Serial No. 460,795, filed October 5, 1942, now Patent No. 2,368,279, issued January 30, 1945. Accordingly, at one end of the torus chamber there is an outer wall which may be of sheet metal 30 and an intermediate partition 31, thus to form an outer channel 32 and an inner channel 33, the channel 32 being defined by the walls 30 and 31, and the channel 33 being defined by the partition 31 and the core 23. These two members of the nest structure are pre-formed and are united by a plurality of supports or spacers 34. These supports may be of sheet metal and may have projections which pass through apertures in the wall members 30 and 31 and which are riveted over for attachment thereto, as shown at 35 and 36. The wall 30 is spaced from the housing, as shown, to provide a passageway 37, and the housing may have spaced projections or lands at 38 against which the member 30 abuts so that the passageway 37 is open for the flow of liquid therethrough. The assembly may be made by pushing the nest structure into position, this action compressing or flexing the outer wall 30 which is permitted by the fact that the supports 34 are shaped to provide a clearance at 39, and when properly positioned, the outer peripheral edge of the wall 30 snaps behind a shoulder 40. The flow of liquid in the torus chamber is in the direction of the arrows and the inner peripheral edge of the nest member 30 may be flared, as at 41.

The nest structure at the opposite end of the torus chamber is of the same construction, thus providing an outer passage or channel 42 and an inner passage or channel 43. The outer wall of the nest structure is shown at 44 and the inner or intermediate member at 45, while the connecting spacers are shown at 46. The arrangement provides a passage or channel 47 similar to the passage 37 at the other end of the torus chamber. For purposes which will presently appear, the housing may have an inlet 48 for the liquid and an outlet 49. The outlet 49, for purposes of clearness, is displaced so that it shows up in the drawings.

The arrangement of this nest structure is such as to provide a substantially uniform velocity front as the liquid is caused to flow through the torus chamber. In a torus chamber of this general type the velocity of the liquid in the outer regions of the torus chamber is greater than that near the inner regions. The preferred arrangement is to construct the blades, and particularly those of the impeller, so that they are designed to receive fluid at a uniform axial velocity across their radial extent. The nest structure described functions to provide a substantially equal velocity front at the different radii. It will be seen that the radial dimension across the inlet to the passage 43, as at $a$, is greater than the radial dimension across the inlet to the passage 42, at $b$; whereas the radial dimension at the outlet of passage 42, namely at $c$, has a radial dimension greater than the outlet $d$ of the passage 43. The nest structure at the opposite end of the torus chamber is arranged so that the radial dimension of the inlet to passage 33, at $e$, is greater than the radial dimension across the inlet $f$ of the channel 32; the outlet of channel 32, at $g$, has a radial dimension greater than the outlet $h$ of the channel 33. The area at $b$ and at $a$ may be substantially the same. The inlet edge, therefore, of the partition 45 is on a greater radius, or nearer the outer wall of the torus chamber, than the outlet edge of partition 31; and the outlet edge of partition 45, that is, at the outlet $c$ and $d$, is on a greater radius than the inlet edge of the partition 31. Thus, passage 32 gradually increases in cross sectional area and passage 33 gradually decreases in the same direction.

It might be considered that some of the liquid which passes into the axial passage 26 from the passage 32 is diverted by the forward edge of the partition 45 and crowded into the passage 43. Likewise, some of the liquid passing out at c from passage 42 may be visualized as being diverted by the forward edge of partition 31 and crowded into the channel 33. Thus, there is a crowding action tending to direct the flowing liquid toward the center of the torus chamber. Possibly the fact that the passage 32 gradually increases in cross sectional area and the passage 33 gradually decreases in the direction of flow of liquid is also a contributing factor. The result is that by selecting a proper diametral relationship of the nest plates relative to each other a substantially uniform velocity of flow may be obtained across the torus chamber in the axial passage 27. This is the passage where a uniform velocity front is desired because the blades of the working elements are situated in this passage. If the velocity front is not uniform in the axial passage 26 no particular disadvantages occur because there are no bladed elements therein. This nest structure of a torus chamber is claimed in the above mentioned patent.

The impeller is carried by the drive shaft 5 to which end the shaft may have a flange 50. The impeller body 52 is positioned between flange 50 and flanged ring element 51, and the flange and ring are secured to the body. This body is circumferential in form and the impeller blades are carried thereby, as shown at 53, and each has a pintle 54 journalled in the body 52 with the axes thereof disposed radially. Each impeller blade may have a circumferential shoulder 55 seating in a recess in the body and an undercut or groove 56 for receiving a U-shaped washer 57 which is held in position when the body 52 is assembled to the flange 50. Thus, each impeller blade may swivel on its axis.

Figure 9:
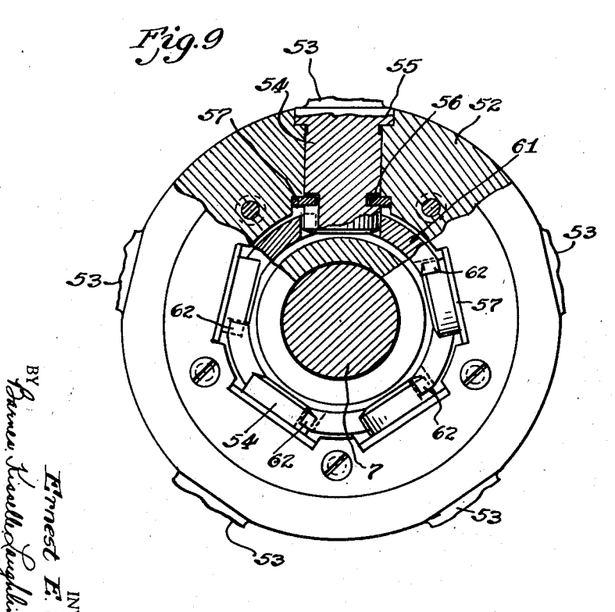
Fig. 9 is a cross sectional view taken substantially on line 9—9 of Fig. 1, illustrating the impeller blades and the control sleeve geared to each blade for regulating the pitch thereof.

There is a control sleeve 60 which is axially shiftable and which is notched at one end to provide projections 61, and one side of each projection is provided with gear teeth, whereas the inner end of the pintle of each impeller blade is provided with a gear segment. The teeth on each projection mesh with the teeth of the gear segment on the adjacent impeller blade, as at 62 (Fig. 9), with the result that axial shift of the sleeve 60 causes an oscillating movement of the impeller blades. The total movement may be about 40° as will presently appear so that the blades may shift to and from a position of substantially zero pitch and a position of maximum pitch.

A manual control is provided for governing the pitch of the impeller blades and to this end an anti-friction bearing 65 is mounted on the control sleeve 60 and over this bearing is a housing 66 attached to control arms 67, in turn connected to oscillating control shaft 68. The control of this shaft is preferably an irreversible controlling means so that once positioned, such position will be maintained against forces applied thereto from the impeller blades. To this end the shaft 68 may have a worm gear 69 thereon positioned outside the housing, as shown in Fig. 8, while a worm 70 mounted on a shaft 71 cooperates therewith. A suitable control handle is shown at 72. Manipulation of the handle to rock the shaft 71 in turn rocks shaft 68 and shifts the control sleeve 60. But forces on the shaft 68 will not rock the shaft 70 because of the irreversible nature of the worm and worm gear. In an automotive vehicle the manual control for the shaft 71 will be located preferably in the driver's compartment so that it is easily accessible.

There is a yielding action between the impeller blades and the irreversible control means which permits of an automatic adjustment of the impeller blades independently of articulation of the manual control. In the present structure this is embodied in the connection between the thrust bearing 65 and the bearing housing 66. The outer race of the thrust bearing is fixed axially with respect to the housing 66 at one side thereof, as at 75, while at the opposite side there is a spring in the form of a Bellville washer 76 positioned behind a shoulder 77 and engageable at its inner peripheral edge by an out-turned part 78 of a washer 79 which engages the outer race. Accordingly, forces applied to the control sleeve which tend to shift it to the left as Fig. 1 is viewed, are transmitted through the washer 79 to the inner edge of the Bellville spring 76, and this spring may flex until the outer edge of washer 79 is stopped by the shoulder 77. This automatic action will be considered in more detail when attention is directed to the operation of the mechanism.

Figure 10:
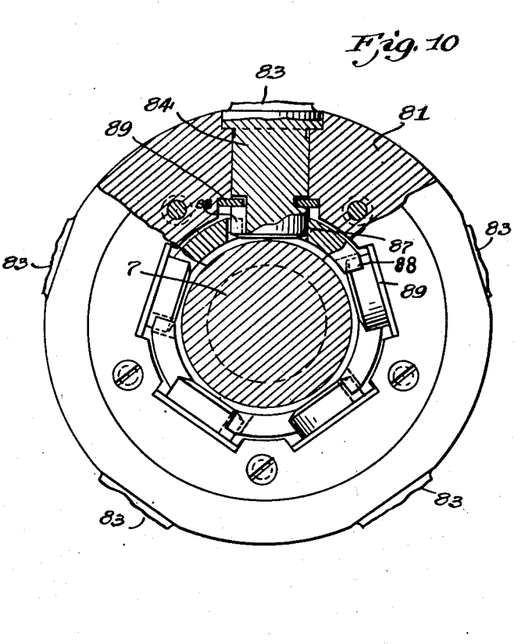
Fig. 10 is a sectional view taken substantially on line 10—10 of Fig. 1, illustrating the control sleeve geared to each blade for governing the pitch of the turbine blades.

The turbine blades are mounted so that they are adjustable on radial axes from high ratio position to low ratio position, and the structure may be substantially identical to the mounting of the impeller blades. The turbine is carried by driven shaft 7. The driven shaft has a flange 80 and the turbine body 81 is positioned between the flange 80 and a flanged ring 82. The body 81 is secured to the flange 80 and ring 82. The blade proper of the turbine is shown at 83 and each has a pintle 84 swiveled in the body 81, held therein by the U-shaped washer 89, and each blade, at the inner end of its pintle, has a gear segment 85. A control sleeve 86 is axially shiftable and it is notched to provide projections 87 with each projection having a gear rack along one side, the teeth of which mesh with the gear segment of a turbine blade as at 88 (Fig. 10). Accordingly, axial movement of the control sleeve 86 causes rocking of the turbine blades on their axes through an angle from their high ratio position to their low ratio position.

Figure 6:
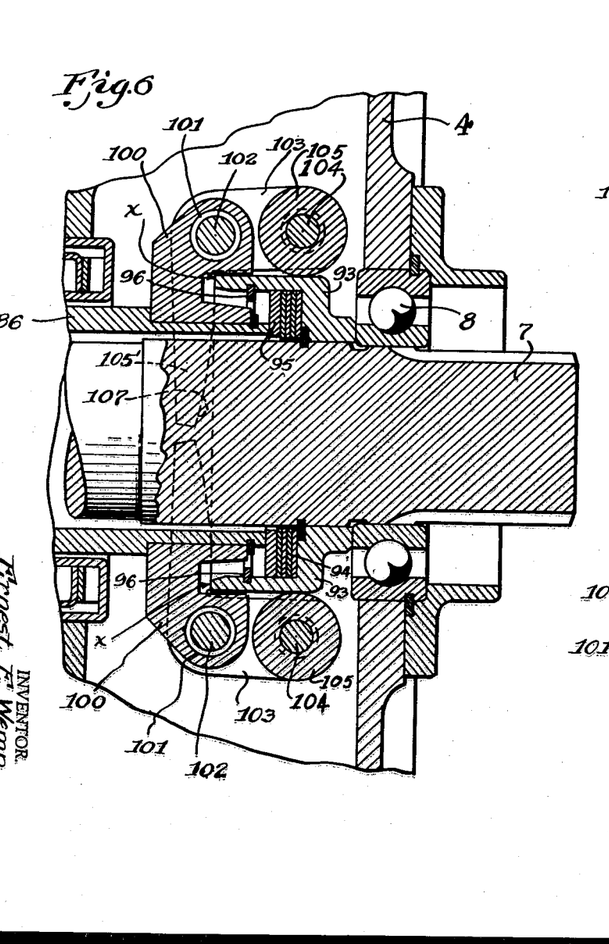
Fig. 6 is a cross sectional view showing the position of certain parts and the substantial collapse of a spring structure when the turbine blades are in their low ratio position.
Figure 7:
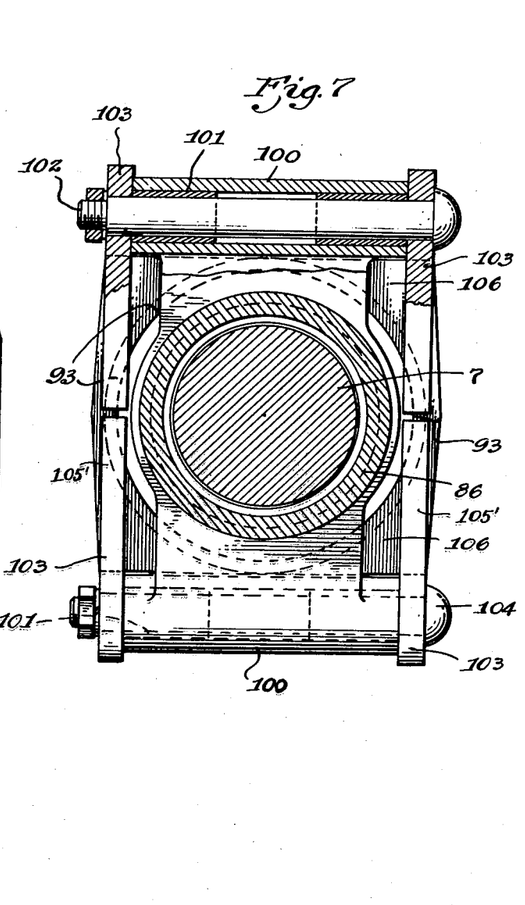
Fig. 7 is a sectional view taken substantially on line 7—7 of Fig. 1, illustrating the centrifugal means for acting upon the turbine blades.

This axial shift of the turbine blades is automatic and is under the combined control of two operating conditions, namely, centrifugal force and output torque, or in other words, the speed of operation and the load. Taking up the control so far as the output torque is concerned, it will be observed that there is a member more or less in the form of a housing 93 mounted on the driven shaft, and this housing contains a yielding arrangement, herein shown as a stack of Bellville spring washers 94 held therein in a position surrounding the shaft 7 by a washer 95 and snap ring 96. The end of the control sleeve 86 is arranged, at certain times and under certain conditions, to engage the washer 95 and as it shifts to the right, as shown in Fig. 6, to compress the stack of springs. When the springs are fully collapsed the turbine blades are in the low ratio position. When the springs are extended to their limit within the housing and the shiftable control sleeve 86 is just clear thereof or exerting no compressive force thereon, the turbine blades are in an intermediate position. From this intermediate position to the high ratio position of the blades the control is centrifugal. To this end a carrier 100 is mounted on the control sleeve and it has oppositely disposed projections 101 which carry fulcrum pins 102. On each end of each fulcrum pin is mounted a bell crank lever 103. The free ends of the two levers are connected as by means of a rivet or the like 104 and mounted thereon is a centrifugal weight 105 in the form of a spool and the weight of which can be varied by selecting the diameter thereof. Thus, there are four bell crank levers but they operate in pairs, there being two levers to each weight.

The control sleeves act more or less as pistons in their reciprocating movement and in order to prevent the trapping of liquid in advance of the control sleeves or the creation of a vacuum in the space adjacent the ends of the control sleeves, the flanges 50 and 80 may be provided with ports 89a to allow inlet and exhaust of fluid. The pressure in the torus chamber will, therefore, be exerted on the ends of the control sleeves and the position of the control sleeves will be influenced thereby. However, the strength of the springs 76 and 94 and the centrifugal weights 105 may be selected to account for this condition.

Each lever has an arm 105' which extends inwardly toward the axis and these arms engage the surface of a flange 106 which is carried at the edge of the member 93. The side of the arms 105' which engage the flange are of curved form, this curvature being illustrated at 107, for the purpose of varying the leverage ratio through which the centrifugal weights function. When the weights are collapsed, or in the absence of centrifugal force, the contact between each lever arm 105' and the flange 106 is disposed at a point relatively close to the fulcrum 102. This may be approximately at the point X in Fig. 6. When the weights are thrown outwardly under centrifugal force the point of contact is relatively remote from the fulcrum or approximately at the point Y of Fig. 1. This may be calculated to substantially take care of the law that the centrifugal force increases with the square of the speed. When the centrifugal force is low the weights function through a relatively short lever arm and thus have a relatively high mechanical advantage, while as the speed increases the length of the lever arm gradually increases, thus reducing the mechanical advantage through which the weights function. This can be arranged so that the centrifugal force effective upon the control sleeve 86 increases substantially directly with the speed of rotation. The curved faces of the lever arms have a rolling contact with the flange so that there is no substantial friction. When the weights move outwardly under centrifugal force the sleeve is forced to the left, as Figs. 1 and 6 are viewed, thus rotating the turbine blades on their axes, and when the weights are in full outward position the turbine blades are in their high ratio position. This will be considered further in considering the operation of the structure.

Before proceeding with the description as regards the blades, it might be said generally that the impeller blades, which are carried by the driving shaft, set up and maintain a flow of liquid in the torus chamber in the direction of the arrows in Fig. 1, and that this causes rotation of the turbine and the driven shaft upon which the turbine is mounted. Water may be used as the liquid or any other suitable fluid, such as an oil, may be used, although water is advantageous because of its high specific gravity and low viscosity. In addition to the circulation of the liquid through the torus chamber, the entire liquid system may be in the circuit so that some of the liquid is being constantly removed from the casing and some replaced. To this end a flow of liquid may enter the inlet 48 and pass through the passage 47 entering the torus chamber at 110, while some leaves the torus chamber at 111, this being the purpose of the shape of the edge 41. The liquid flows through channel 37 and out at 49. The outside circuit may include a pump and a cooler, as shown in the above mentioned patent.

Suitable seals are provided to prevent leakage wherever necessary as, for example, between the housing and the ring 51 at 112 and between the housing and the ring 83 at 113, and between the driving and driven shafts at 114. Also, seals may be provided for the shiftable control sleeves, these being illustrated as the O-ring type at 115. This is a well-known, efficient type of seal and one may be provided at 116 adjacent the seal 114.

Figure 2:
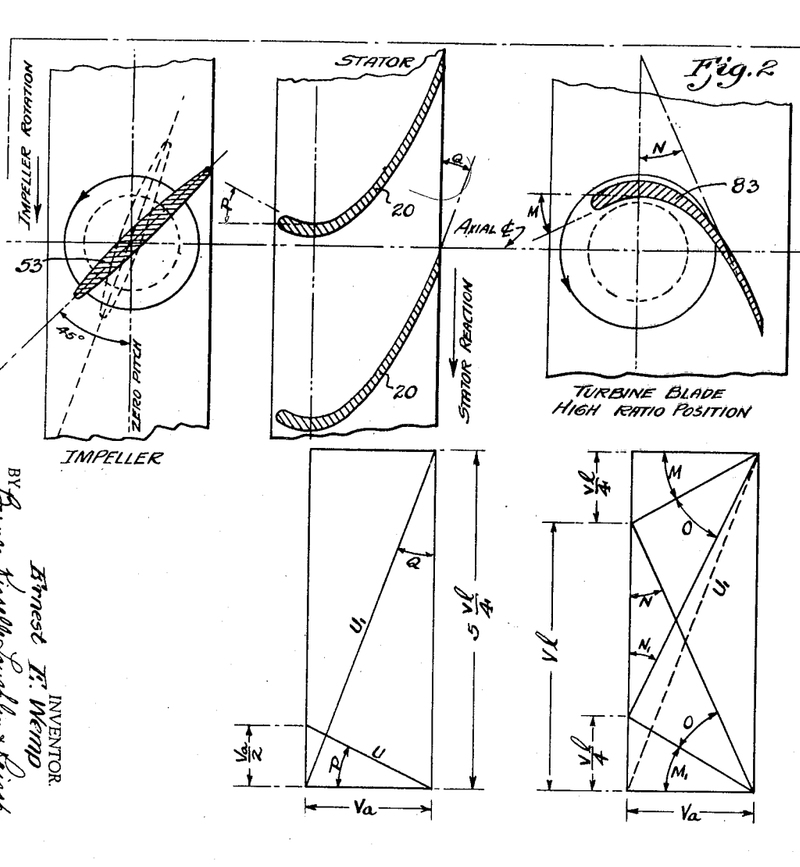
Fig. 2 is a layout showing the blade sections of the impeller, stator and turbine, the sections being taken substantially on the line 2—2 of Fig. 1.

One form of blade layout is illustrated in Fig. 2. The impeller blade 53 is shown in its position of maximum pitch. In this position the control sleeve 60 is shifted to the right, as Fig. 1 is viewed. It is noted that the blade 53 is not centered on the axis of rotation but that the trailing edge is of greater extent than the leading edge. Therefore, the forces of the liquid on the impeller blade tends to rock the same counter-clockwise, as Fig. 2 is viewed. This tends to shift the blade toward its zero pitch position and it can do so within a given range as permitted by the spring structure 76. The operator may shift the impeller blades from maximum to zero pitch by the manual control means. When the impeller blades have zero pitch there is substantially no movement imparted to the liquid and no transmission of torque other than that of unavoidable friction. Within the range of angular movement of the impeller blades permitted by the spring 76, this movement being caused by the load on the impeller blades, the impeller blades may seek a position of maximum pitch for the conditions existing at the moment.

The liquid discharged from the impeller blades or, in other words, caused to flow axially in the torus chamber, is received by the stator blades and these blades are arranged to receive the liquid substantially without shock. However, the liquid is not only given a velocity in an axial direction by the impeller, but it has imparted thereto a tangential component. In the vectorial diagram associated with the stator vanes in Fig. 2, the vector $Va$ represents the axial velocity while $Va/2$ represents that of the tangential component. The tangential component, as shown by the diagram, is about one-half the axial velocity. The vector U, therefore, represents the angle and velocity of the liquid leaving the impeller. The entrance tips of the stator blades, as shown, receive the liquid without shock and the tangential component is reversed as the shape of the blades is such that the liquid is discharged from the stator at the angle Q, the vector U' illustrating the angle and magnitude of the liquid velocity leaving the stator.

The turbine blade in Fig. 2 is shown in its high ratio position, this being the position when the control sleeve 86 is shifted to its limit to the left, as Fig. 1 is viewed. It is to be noted at this time that the turbine blade is disposed relative to its axis of oscillation so that the forces of the liquid thereon tend to oscillate the blade counter-clockwise, the blade being unbalanced relative to its pivotal mounting.

With the blade in this high ratio position the lineal velocity is represented in the diagram at $V1$, and with the liquid entering the turbine blades at the absolute velocity of U', the proper entrance angle to receive the liquid without shock is the angle M. The turbine blades change the direction of the flow of liquid through the angle O and discharge the same in an axial direction. The angle N shown on the vectorial diagram is the proper discharge angle to obtain an axial discharge when the lineal velocity of the turbine is V1.

Figure 3:
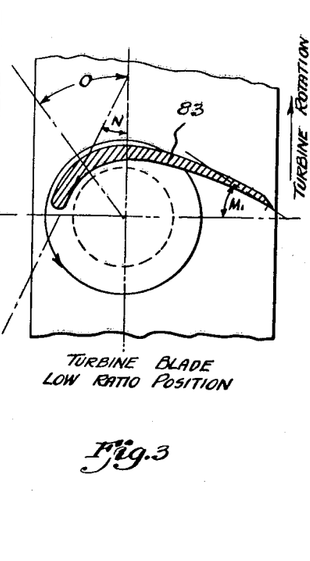
Fig. 3 is a view showing the turbine blade shifted to its low ratio position.

With a lineal velocity of V1/4 and the turbine blades are adjusted to their low ratio position, as shown in Fig. 3, this being when the sleeve 86 is shifted to the right as Fig. 1 is viewed, the blades have moved through the angle O. Accordingly, the proper entrance angle to receive the liquid without shock at the absolute velocity of U' is M+O, or, in other words, the angle N'. The turbine blades change the direction of the liquid and discharge the same at the angle M', which is the proper angle to effect axial discharge at the lineal velocity of V1/4.

Accordingly, the liquid entering the turbine at the absolute velocity of U' may enter the same without shock when the turbine blades are in the high ratio position with the lineal velocity of V1 and may enter the turbine blades without shock when the blades are in the low ratio position at the lineal velocity of V1/4, and in both instances the discharge is axial.

The direction of rotation of the impeller, as shown in Fig. 2, is downwardly as the figure is viewed. The stator blades change the angle of the absolute velocity from U to U' and discharge the liquid on to the turbine blades. This causes rotation of the turbine blades in a direction which is upwardly, as Fig. 2 is viewed. Thus, the turbine operates in a direction reverse to that of the impeller, and the driven shaft operates reverse to the drive shaft. The direction of rotation of the driven shaft, however, is relatively immaterial so far as transmitting the torque to a final driven member is concerned, as the direction of rotation of the final driven member may be determined by mechanical power transmitting means. The number of blades on the impeller, stator and turbine should be selected in accordance with good hydraulic practice.

Figures 4, 5:
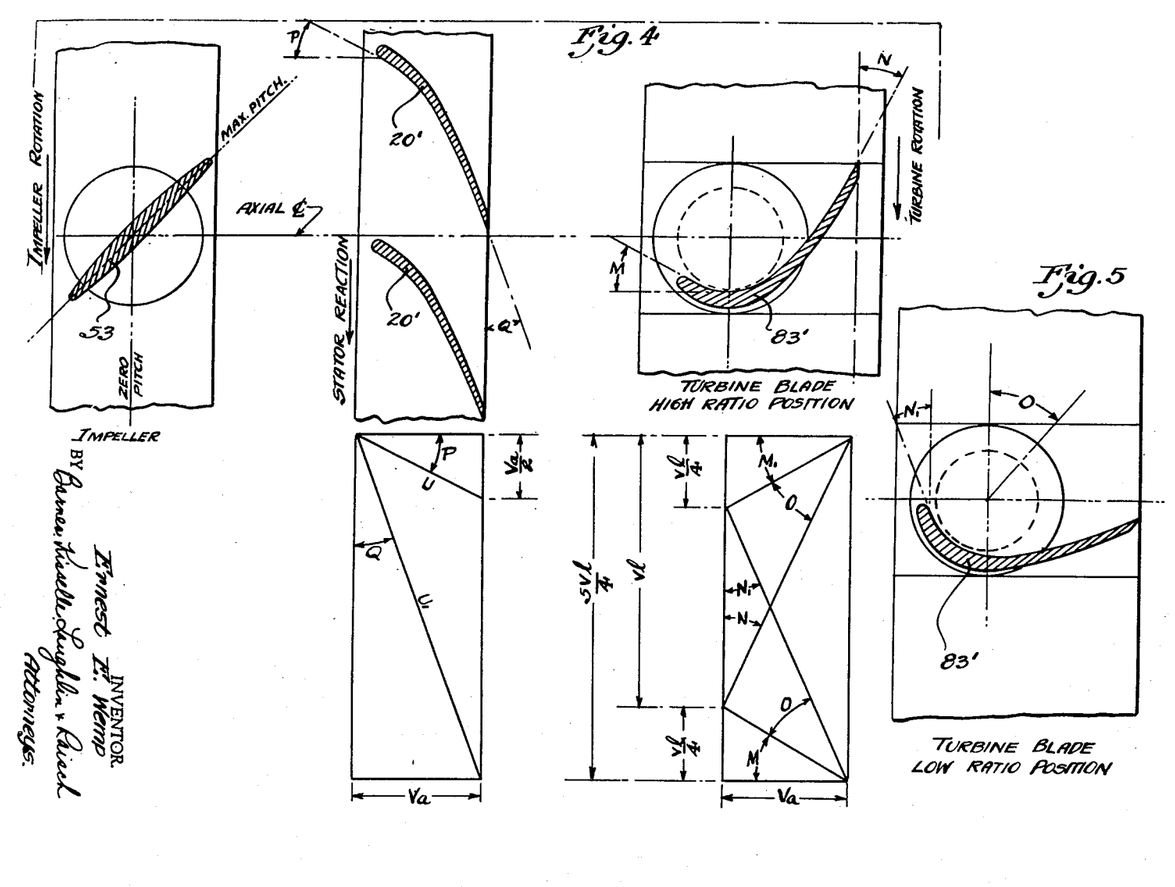
Fig. 4 is a view similar to Fig. 2 showing a blade layout of the impeller, stator and turbine, and illustrating a modified form.
Fig. 5 is a view showing the turbine blade of Fig. 3 shifted to its low ratio position.

In Figs. 4 and 5, a blade set is shown wherein the turbine has the same direction of rotation as the impeller. In this view the impeller blades may be the same as the previously described impeller blades and are represented by the same reference character 53. The liquid is received by the stator blades at the absolute velocity indicated by the vector U, which is a function of the axial velocity Va and the tangential component Va/2. Instead of reversing the tangential component, these stator blades accept the liquid at the velocity U and discharge the same at the absolute velocity having a tangential component in the same direction as illustrated by the vector U'. The turbine blades are the same as those shown in Figs. 2 and 3 except that they are reversely mounted. In the high ratio position, with the turbine blade 83' in its high ratio position and with the lineal velocity V1, the proper angle at the blade tips for receiving the liquid without shock at absolute velocity U' is M. The blades change the direction of the liquid and discharge the same at the angle N, which is the proper angle to effect axial discharge at V1 lineal velocity.

When the blade 83' is in its low ratio position, as shown in Fig. 5, it has been moved through the angle O, and at the lineal velocity of V1/4, the proper entrance angle at the blade tips for receiving the liquid at U' absolute velocity without shock is N'. The blades discharge the liquid at the angle M', which is the proper angle for axial discharge at V1/4 lineal velocity.

In the two blade sets illustrated, the turbine blades are shown as being shiftable from a high ratio position having a lineal velocity of V1 to a low ratio position having a lineal velocity of V1/4, with shockless entry of the liquid into the turbine at these two extreme positions. In the intermediate positions of the turbine blades the liquid is also received substantially without shock and discharged substantially axially.

Considering now the operation of the mechanism as a whole: When the impeller blades are positioned for zero pitch, substantially no flow of liquid is caused in the torus chamber with no torque transmitted to the turbine other than that incident to friction. It has been found that the torque due to friction or drag is extremely low, so that if the mechanism be in an automotive vehicle, for example, there is an effective neutral which permits the engine to operate with practically no drag or creeping action imparted to the vehicle. In order to transmit torque to the turbine, the operator may shift the impeller blades from zero pitch position to a position of pitch, and indeed, the operator may, with impudence, shift the impeller blades to their maximum pitch position. At this moment, with the turbine and driven shaft at rest, there is no centrifugal force, and the sleeve 86 will be in some intermediate position with the result that the turbine blades are in a position somewhere between their high ratio position and low ratio position. The flow of oil which is initiated by the adjusting of the impeller blades is received by the turbine blades, and the force thereof tends to swing the turbine blades on their pintles toward their low ratio position. This is resisted by the yielding elements 94. If the resistance or load on the driven shaft 7 is high enough, the stack of springs 94 will be completely collapsed, as shown in Fig. 6, at which time the turbine blades assume their extreme low ratio position. This causes a turning of the driven shaft and movement of the vehicle. As the resistance on the driven shaft decreases, the springs expand and shift the sleeve 86 to the left, thereby oscillating the turbine blades from their extreme low ratio position toward a higher ratio position. This action may take place slowly, since the spring force and the forces on the turbine blades are balanced against each other. As a result, the position of the turbine blades during this phase of operation is controlled by the output torque. Of course, there are other times when the output torque controls the position of the turbine blades as, for example, when the engine or vehicle is decelerated under heavy load.

As the speed of rotation increases, the centrifugal weights come into play and the centrifugal force shifts the sleeve 86 to the left, and ultimately the turbine blades may assume their extreme high ratio position, shown in Fig. 2. Therefore, at higher speeds the position of the blades is determined by the speed of rotation, and, due to the arrangement of the levers 105 with their point of contact with the flange 106, the effect of the centrifugal force may increase substantially directly with the speed. There may be occasions, for example, upon rapid acceleration from zero, when there is a combined spring and centrifugal action on the turbine blades.

When an automotive vehicle, for example, is operating at high speed and under low torque, the turbine blades will be in their high ratio position. A substantial reduction in speed may take place and still the blades may remain in the high ratio position where the output torque is low. On the other hand, if the output torque increases and thus lowers the speed of rotation, the centrifugal force lessens, and if the output torque is high enough, the turbine blades will begin to shift from their high ratio position toward a low ratio position, thus giving an automatic control. The above description has been made principally with reference to the blades shown in Figs. 2 and 3, but the turbine blades shown in Figs. 4 and 5 function in the same manner.

Figure 12:
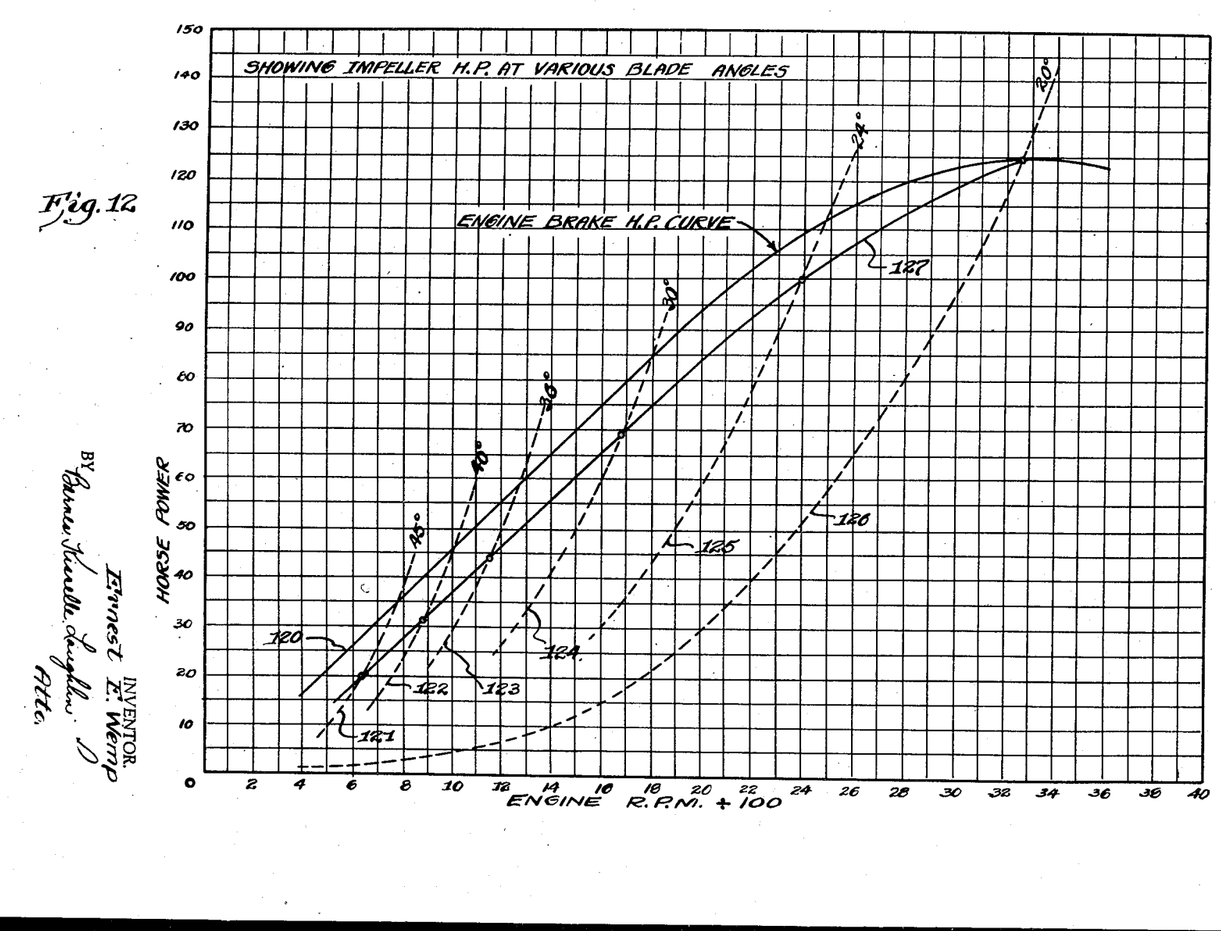
Fig. 12 is a diagram showing the power curve of an exemplary engine and the impeller power at various blade angles.

In order to set forth the operation of the impeller blades and the conditions which exist at the impeller, reference may be made to Fig. 12, which shows an exemplary situation. This chart illustrates the horse-power of a given engine at various engine R. P. M.'s, the brake horse-power curve being shown at 120. The several broken lines illustrate the impeller horse-power at various angles of the impeller blades, the line 121 showing the impeller horse-power when the blades are at an angle of 45° and the lines 122 to 126, inclusive, showing the impeller horse-power with the impeller blades at 40°, 36°, 30°, 24° and 20°, respectively. From a consideration of this chart, the operation of a vehicle, for example, equipped with the present invention, will be seen to be wholly different from the operation of the present vehicle. For instance, in a present vehicle having an engine with a horse-power curve, as shown, the engine is turning over at 2800 R. P. M. when the vehicle is traveling sixty miles an hour, and about 2300 R. P. M. at fifty miles an hour and 1400 R. P. M. at thirty miles an hour. The R. P. M. of the engine and the speed of movement of the vehicle are in direct proportion to each other because they are directly connected. Yet it will be appreciated that when traveling sixty miles an hour, the torque necessary to maintain this speed may not be very high, but nevertheless, the engine is required to rotate at a high speed near its maximum horse-power. With the present arrangement, there is a complete disassociation in this respect between the engine and the speed of the vehicle; in other words, the R. P. M. of the engine and the speed of the vehicle are divorced from each other. With the blades set at about 45°, it will be noted that the impeller horse-power rises more rapidly than the engine horse-power and intersects the engine curve at about 780 R. P. M. It follows that if this blade angle is maintained, no higher engine speeds could be obtained. The impeller blade angle must, therefore, be reduced in some way if higher engine speeds are to be attained. The 40° angle blade set shows an impeller horse-power curve intersecting the maximum power curve for the engine at about 1,000 R. P. M. As the pitch of the impeller blades is reduced, the impeller horse-power curves intersect the horse-power curve of the engine at progressively increasing R. P. M.'s. In the arrangement shown, the blade angle must be in the vicinity of 20° in order to attain an engine R. P. M. sufficient for attaining maximum engine brake horse-power, which is about 125 horse-power.

Now, as mentioned previously, the operator may shift the control with impudence to place the impeller blades in maximum pitch position or about 45°. Due to the fact that the impeller blades are unbalanced, the pressure on the impeller blades causes a flexing of the spring structure, and this structure is preferably arranged to yield so that the blades may shift to a lower pitch angle, such as to permit of an engine R. P. M. which provides the maximum engine horse-power. In the arrangement shown, this will be about 20°. Upon an increase of the R. P. M. of the engine and impeller, there is a proportional increase in axial velocity of the liquid in the torus chamber. This increases the pressure per square inch on the impeller blades. This pressure increase is in accordance with the square of the increase of axial velocity of the liquid. Due to the unbalanced condition of the blades, this pressure causes them to shift toward a lower pitch position against the action of the yielding means. In other words, as the R. P. M. increases, the pressure increases and the blades progressively shift toward a lower pitch position.

Accordingly, before an R. P. M. is reached, where the power curve of the impeller intersects the power curve of the engine, with the blades set at 45°, the spring structure yields to decrease the blade angle. This permits a further acceleration, increasing the axial flow, in turn increasing the pressure on the blades and causing them to shift to a still further lower angle. The yielding structure may be calculated so that the impeller horse-power at any R. P. M. is just a desirable amount under the maximum horse-power of the engine at any R. P. M. This is indicated by the curve 127. The two curves may intersect, however, at the R. P. M. of maximum horse-power.

In an exemplary situation, a vehicle moving along a level highway at fifty miles an hour may require only about 33 horse-power. The impeller will produce this horse-power at about a 40° blade angle. Accordingly, the R. P. M. of the engine may be only about 900, since the maximum engine horse-power at 900 R. P. M. is in excess of that required to keep the vehicle moving. Accordingly, a condition exists where the engine may operate at a low R. P. M. and somewhere near its maximum horse-power for that speed, while the vehicle is traveling at fifty miles an hour which, under present conditions, represents an engine speed of around 2300 R. P. M. As a result, the engine may operate much of the time under a fairly full throttle, which represents an efficient condition. As the R. P. M. increases from this mentioned point of about 900 R. P. M., the yielding means permits shifting of the impeller blades to a lower pitch, and this may progress to the point where the engine reaches an R. P. M. of maximum horse-power. Under certain driving conditions, say at thirty or thirty-five miles an hour, the engine may operate at an R. P. M. which may not exceed the normal idling speed of an engine, which may be about 500 R. P. M.

Accordingly, it will be observed that if the mechanism is employed for the transmission of power in an automotive vehicle, an operator has but a single control in addition to the engine throttle, namely, that of shifting the impeller blades. The turbine blades automatically adjust themselves to conditions under the combined control of output torque and speed of rotation. The drive shaft, regardless of its direction of rotation, may be coupled to the final drive, for example, a rear axle, so as to drive the vehicle forwardly, and suitable means may be employed for reversing the direction of rotation imparted to the driving axle to effect reverse movement of the vehicle. Under these circumstances, a variable torque ratio is obtained in both forward and reverse movements of the vehicle.

While it has been convenient to visualize the invention as it may be applied to an automotive vehicle, the invention may, of course, be used in numerous other places for the transmission of torque.

I claim:

1. In a hydraulic torque converter, the combination of a driving member, a driven member, a torus chamber for liquid extending around the members and concentric therewith, an impeller mounted on the driving member and having blades operating in the torus chamber, a turbine on the driven member and having blades operating in the torus chamber, a stator having blades located in the torus chamber between the impeller and the turbine, means mounting the impeller blades for oscillation in unison on substantially radial axes, manually operable control means for adjustably shifting the impeller blades on their axes substantially from zero pitch to maximum pitch, said impeller blades being disposed in an unbalanced manner relative to their axes so that the pressure of the liquid tends to rock the blades toward zero pitch position and yielding means opposing the pressure and arranged to yield for oscillation of the impeller blades through a range of movement limited to less than the maximum adjustment of the impeller blades on their axes toward zero pitch so that the impeller blades may automatically seek a pitch position within said range which is substantially maximum for the conditions existing in the torus chamber.

2. In a hydraulic torque converter, the combination of a driving member, a driven member, a torus chamber for liquid, an impeller mounted on the driving member and having blades operating in the torus chamber, a turbine on the driven member and having blades operating in the torus chamber, a stator having blades located in the torus chamber between the impeller and turbine, means mounting the impeller blades for oscillation on substantially radial axes, a manually operable shiftable sleeve operably associated with the impeller blades for oscillating the same substantially from zero pitch to maximum pitch, a thrust bearing mounted on the sleeve, means for applying shifting movement to the bearing, spring means interposed between the thrust bearing and said last-named means for providing limited movement of the impeller blades on their axes, the impeller blades being disposed in an unbalanced manner relative to their axes so that the pressure of the liquid tends to rock the blades toward zero pitch position, said spring means being arranged to yield against the said pressure whereby the position of the impeller blades varies within the limits permitted by the spring in accordance with the pressure on the blades.

3. In a hydraulic torque converter, a torus chamber for liquid, a bladed impeller for causing flow of liquid in the torus chamber, a turbine, blades on the turbine operating in the torus chamber whereby the turbine is driven by the flow of liquid, means mounting the blades on the turbine substantially on radial axes for oscillation from low ratio position to high ratio position, said turbine blades being disposed in an unbalanced manner relative to their axes so that the output torque tends to shift the blades toward low ratio position, means yieldingly resisting movement of the blades under output torque, and means responsive to the speed of rotation of the turbine for acting upon the turbine blades and tending to shift the same toward high ratio position, whereby the position of the turbine blades is governed by output torque and speed.

4. In a hydraulic torque converter, a torus chamber adapted to have a flow of liquid therein, a turbine, blades on the turbine operating in the torus chamber whereby the turbine is driven, means mounting the blades for oscillation substantially on radial axes from low ratio position to high ratio position, said blades being disposed in an unbalanced manner relative to their axes so that the forces thereon tend to shift the blades toward low ratio position, a shiftable control member for the blades, centrifugal means operated by the turbine effective upon the control member and applying forces thereto for shifting the blades toward high ratio position, a lever for transmitting the centrifugal forces to the control member, a reaction surface for the lever and a rocker contact surface on the lever which shifts toward and away from the pivot of the lever as the speed of rotation varies so as to change the mechanical advantage through which the centrifugal force functions calculated so that the effect of the centrifugal force increases substantially directly with the speed.

5. In a hydraulic torque converter, a torus chamber adapted to have a flow of liquid therein, a turbine, blades on the turbine operating in the torus chamber whereby the turbine is driven, means mounting the blades for oscillation substantially on radial axes from low ratio position to high ratio position, said blades being disposed in an unbalanced manner relative to their axes so that the forces thereon tend to shift the blades toward low ratio position, a shiftable control member for the blades, centrifugal means operated by the turbine, and means for transmitting the force thereof to the control member and including means for changing the mechanical advantage calculated so that the effect of the centrifugal force increases substantially directly with the speed.

6. In a hydraulic torque converter, a torus chamber for liquid, an impeller having blades positioned in the torus chamber, a turbine having blades positioned in the torus chamber, a stator having blades positioned in the torus chamber and between the impeller and turbine, means for mounting the impeller blades so that they can shift substantially from zero pitch to maximum pitch, manually operable control means for so shifting the impeller blades, yielding means in said control means so that the impeller blades may shift through a range toward zero pitch under the pressure of the liquid, means for mounting the turbine blades so that they can shift from low ratio position to high ratio position, said turbine blades being disposed in an unbalanced manner so that the forces delivered thereto by the liquid tend to oscillate them toward low ratio position, a shiftable control member connected to the turbine blades and movable as they oscillate, yielding means for acting upon the control member in opposition to the movement toward low ratio position when the turbine blades are in a range of relatively low ratio positions and centrifugal means operated by the turbine acting upon said control member in opposition to the movement toward low ratio position.

7. In a hydraulic torque converter, a torus chamber for liquid, an impeller having blades positioned in the torus chamber, a turbine having blades positioned in the torus chamber, a stator having blades positioned in the torus chamber and between the impeller and turbine, means for mounting the impeller blades so that they can shift substantially from zero pitch to maximum pitch, control means for so shifting the impeller blades, yielding means in said control means so that the impeller blades may shift through a range toward zero pitch under the pressure of the liquid, means for mounting the turbine blades so that they can shift from low ratio position to high ratio position, said turbine blades being disposed in an unbalanced manner so that the forces delivered thereto by the liquid tend to oscillate them toward low ratio position, a shiftable control member connected to the turbine blades and movable as they oscillate, yielding means for acting upon the control member in opposition to the movement toward low ratio position when the turbine blades are in a range of relatively low ratio positions and centrifugal means acting upon said control member in opposition to the movement toward low ratio position, and means providing a changing mechanical ratio for transmitting the centrifugal forces to the control member so arranged that the effective centrifugal force increases substantially directly with the speed.

8. In a hydraulic torque converter, a torus chamber for liquid, a driving member, a driven member, an impeller having blades operating in the torus chamber for establishing a flow of liquid therein, a turbine connected to the driven member having blades operating in the torus chamber to be driven by the flow of liquid, a stator having blades positioned between the impeller and turbine, means for mounting the impeller and turbine blades for oscillation substantially on radial axes, the impeller blades and turbine blades both being disposed in an unbalanced manner relative to their axes so that the pressure of the liquid tends to shift the impeller blades toward zero position and the turbine blades toward low ratio position, control means operable at will for shifting the impeller blades to and from substantially zero pitch and maximum pitch, yielding means associated with the impeller blades for oscillation of the impeller blades in a direction toward a pitch position from zero pitch position, yielding means for opposing oscillation of the turbine blades toward low ratio position at relatively low speeds of rotation and centrifugal means effective principally above the said relatively low speeds of rotation for shifting the turbine blades toward high ratio position.

ERNEST E. WEMP.

REFERENCES CITED

The following references are of record in the file of this patent:

UNITED STATES PATENTS

| Number | Name | Date |
|---|---|---|
| 1,900,120 | Lysholm | Mar. 7, 1933 |
| 1,993,741 | Jandasek | Mar. 12, 1935 |
| 2,162,543 | Banner | June 13, 1939 |
| 2,205,794 | Jandasek | June 25, 1940 |
| 2,271,919 | Jandasek | Feb. 3, 1942 |
| 2,287,374 | Dodge | June 23, 1942 |
| 2,294,351 | White | Aug. 25, 1942 |
| 2,317,938 | Putt | Apr. 27, 1943 |
| 2,318,187 | Addison | May 4, 1943 |
| 2,387,415 | Sibert | Oct. 23, 1945 |

FOREIGN PATENTS

| Number | Country | Date |
|---|---|---|
| 517,875 | Great Britain | 1940 |
| 536,735 | France | 1922 |
| 769,904 | France | 1934 |
| 332,927 | Germany | 1921 |
| 94,287 | Switzerland | 1922 |
| 177,014 | Switzerland | 1935 |
| 181,173 | Switzerland | 1936 |